United States Patent
Kondou

(10) Patent No.: US 10,847,995 B2
(45) Date of Patent: Nov. 24, 2020

(54) ENCODER AND BACKUP CURRENT ABNORMALITY DETERMINING METHOD BASED ON THE ROTATIONAL SPEED OF THE OBJECT OF DETECTION

(71) Applicant: FANUC CORPORATION, Yamanashi (JP)

(72) Inventor: Youhei Kondou, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 104 days.

(21) Appl. No.: 16/278,396

(22) Filed: Feb. 18, 2019

(65) Prior Publication Data

US 2019/0260223 A1    Aug. 22, 2019

(30) Foreign Application Priority Data

Feb. 20, 2018   (JP) ................... 2018-028008

(51) Int. Cl.
  *G01D 3/08*  (2006.01)
  *H02J 9/06*  (2006.01)
  *G01D 11/00* (2006.01)
  *G01D 5/26*  (2006.01)

(52) U.S. Cl.
  CPC ............ *H02J 9/06* (2013.01); *G01D 5/26* (2013.01); *G01D 11/00* (2013.01)

(58) Field of Classification Search
  CPC ...... G01D 11/00; G01D 5/26; G01D 5/24457; G01D 3/08; H02J 9/06
  USPC ........................ 250/231.13, 214 R
  See application file for complete search history.

(56) References Cited

U.S. PATENT DOCUMENTS 10,451,445 B2 * 10/2019 Nisino ............... G01D 5/24457
2009/0229134 A1    9/2009 Nagase

FOREIGN PATENT DOCUMENTS

| JP | 2006292491 A | 10/2006 |
| JP | 2007288970 A | 11/2007 |
| JP | 200892773 A  | 4/2008  |
| JP | 2008151526 A | 7/2008  |
| JP | 2010110133 A | 5/2010  |

(Continued)

OTHER PUBLICATIONS

English Abstract and Machine Translation for Japanese Publication No. JP2010-110133A, published May 13, 2010, 15 pgs.

(Continued)

*Primary Examiner* — Que Tan Le
(74) *Attorney, Agent, or Firm* — Fredrikson & Byron, P.A.

(57) ABSTRACT

An encoder for detecting a rotation angle of an object of detection includes: a main circuit including a rotational speed obtaining portion configured to obtain a rotational speed of the object of detection; a backup battery for supplying power to the main circuit while the main circuit is disconnected from a main power-supply circuit; a current obtaining portion configured to obtain a consumption current of the backup battery as a backup current while the electric power is being supplied from the backup battery to the main circuit; and a current abnormality determining portion configured to determine that the backup current is abnormal if the backup current is larger than a given current value when the rotational speed of the object of detection obtained by the rotational speed obtaining portion is a given rotational speed.

8 Claims, 4 Drawing Sheets

(56) References Cited

FOREIGN PATENT DOCUMENTS

| JP | 201246047 A | 3/2012 |
|----|----|----|
| JP | 2013137255 A | 7/2013 |
| JP | 2016124094 A | 7/2016 |
| JP | 2016134926 A | 7/2016 |
| WO | 2007010716 A1 | 1/2007 |
| WO | 2016010141 A1 | 1/2016 |

OTHER PUBLICATIONS

English Abstract and Machine Translation for Japanese Publication No. 2007-288970 A, published Nov. 1, 2007, 5 pgs.
English Abstract and Machine Translation for Japanese Publication No. 2016-124094 A, published Jul. 11, 2016, 11 pgs.
English Abstract and Machine Translation for Japanese Publication No. 2008-151526 A, published Jul. 3, 2008, 7 pgs.
English Abstract and Machine Translation for Japanese Publication No. 2016-134926 A, published Jul. 25, 2016, 9 pgs.
English Abstract and Machine Translation for Japanese Publication No. 2012-046047 A, published Mar. 8, 2012, 11 pgs.
English Abstract and Machine Translation for Japanese Publication No. 2008-092773 A, published Apr. 17, 2008, 7 pgs.
English Abstract and Machine Translation for Japanese Publication No. 2013-137255 A, published Jul. 11, 2013, 9 pgs.
English Abstract and Machine Translation for Japanese Publication No. 2006-292491 A, published Oct. 26, 2006, 7 pgs.
English Abstract and Machine Translation for Intl. Publication No. WO/2016/010141 A1, published Jan. 21, 2016, 66 pgs.

* cited by examiner

ENCODER AND BACKUP CURRENT ABNORMALITY DETERMINING METHOD BASED ON THE ROTATIONAL SPEED OF THE OBJECT OF DETECTION

CROSS-REFERENCE TO RELATED APPLICATION

This application is based upon and claims the benefit of priority from Japanese Patent Application No. 2018-028008 filed on Feb. 20, 2018, the contents of which are incorporated herein by reference.

BACKGROUND OF THE INVENTION

Field of the Invention

The present invention relates to an encoder having a backup battery, and a backup current abnormality determining method for an encoder having a backup battery.

Description of the Related Art

International Publication No. WO 2007/010716 discloses an encoder for detecting a rotation angle of an object of detection.

SUMMARY OF THE INVENTION

The encoder has a backup battery and detects the rotation angle of the object of detection by using electric power from the backup battery even when the main power supply is off. Consequently, even when the object of detection rotates while the main power supply is off, the rotation angle of the object of detection can be accurately detected when the main power supply turns on. When an abnormality occurs in the backup current supplied from the backup battery, the power of the backup battery may be consumed early. It is therefore necessary to check the backup current for abnormalities. However, the technique described in International Publication No. WO 2007/010716 provides no disclosure about checking the backup current for abnormalities, and it is not possible to make a determination as to whether an abnormality is occurring in the backup current.

The present invention has been made to solve the problem above, and an object of the present invention is to provide an encoder which can determine whether an abnormality is occurring in a backup current and a backup current abnormality determining method.

According to a first aspect of the present invention, an encoder for detecting a rotation angle of an object of detection includes: a main circuit including a rotational speed obtaining portion configured to obtain a rotational speed of the object of detection; a backup battery for supplying electric power to the main circuit while the main circuit is disconnected from a main power-supply circuit; a current obtaining portion configured to obtain a consumption current of the backup battery as a backup current while the electric power is being supplied from the backup battery to the main circuit; and a current abnormality determining portion configured to determine that the backup current is abnormal if the backup current is larger than a given current value when the rotational speed of the object of detection obtained by the rotational speed obtaining portion is a given rotational speed.

According to a second aspect of the present invention, in an encoder having a backup battery for supplying electric power to a main circuit while the main circuit is disconnected from a main power-supply circuit, a backup current abnormality determining method for determining whether a backup current corresponding to a consumption current of the backup battery is abnormal includes: a current obtaining step of obtaining the consumption current of the backup battery as the backup current while the electric power is being supplied from the backup battery to the main circuit; a rotational speed obtaining step of obtaining a rotational speed of an object of detection; and a current abnormality determining step of determining that the backup current is abnormal if the backup current is larger than a given current value when the rotational speed of the object of detection obtained at the rotational speed obtaining step is a given rotational speed.

According to the present invention, it is possible to determine whether an abnormality is occurring in the backup current.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Embodiment

[Configuration of Encoder]

Figure 1:
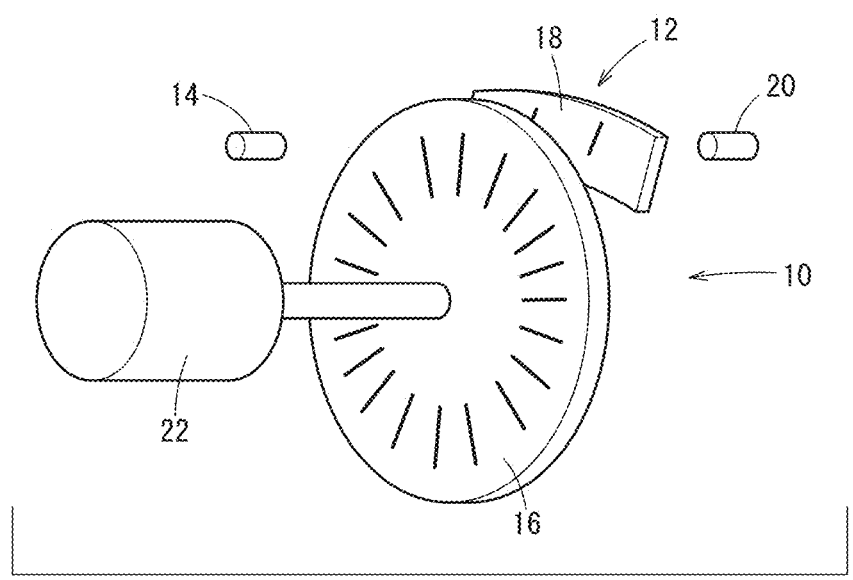
FIG. 1 is a perspective view of a detecting portion of an encoder.
Figure 2:
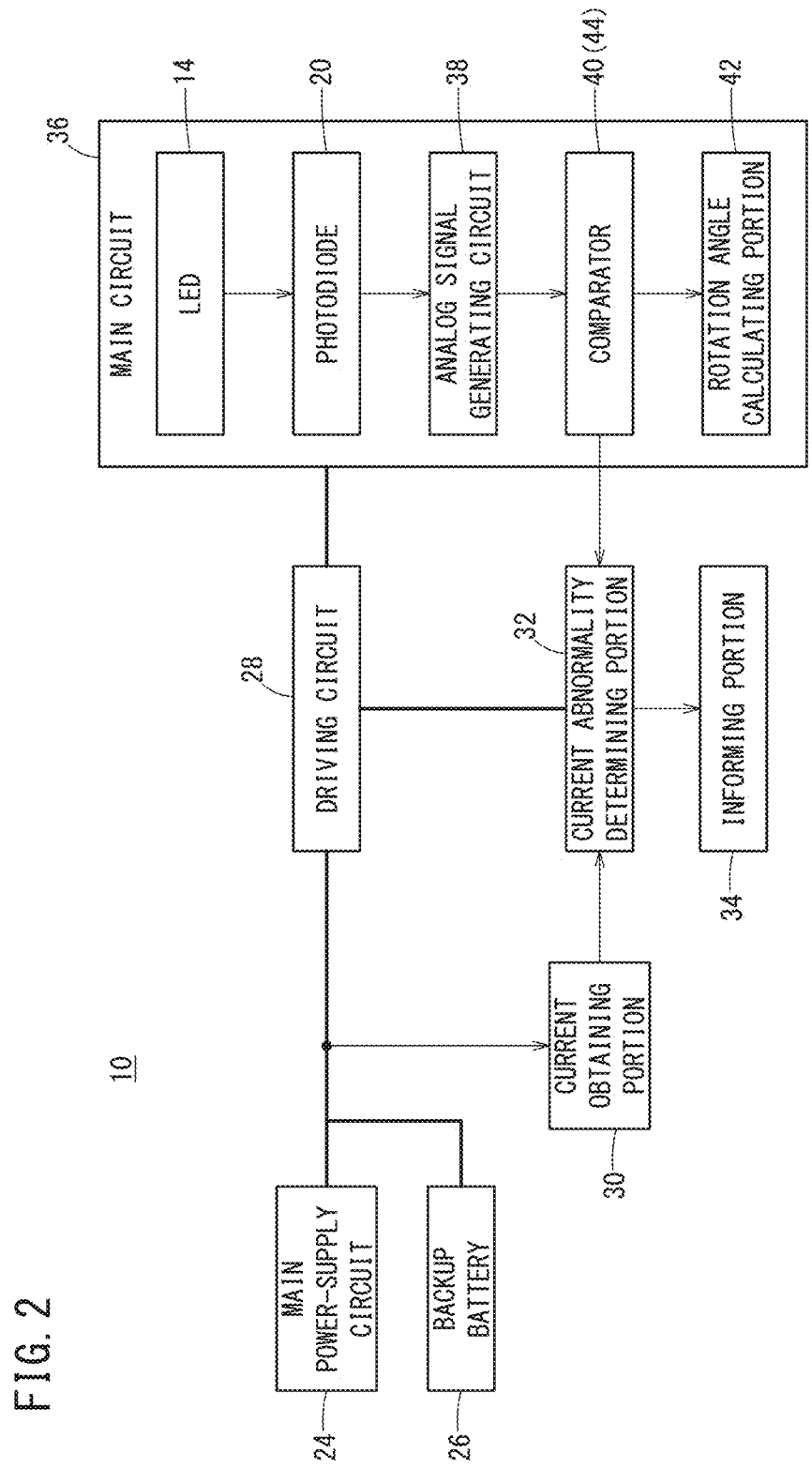
FIG. 2 is a block diagram of the encoder.

FIG. 1 is a perspective view of a detecting portion 12 of an encoder 10. FIG. 2 is a block diagram of the encoder 10. The detecting portion 12 includes an LED (Light Emitting Diode) 14, a rotary disk 16, a fixed slit 18, and a photodiode 20. The rotary disk 16 has an optical pattern written thereon, and is disposed so that it rotates integrally with the rotating shaft of an object 22 of detection, such as a motor. The fixed slit 18 has a plurality of slits and is disposed between the rotary disk 16 and the photodiode 20. Light emitted from the LED 14 is transmitted or blocked as the rotary disk 16 rotates. The light transmitted through the rotary disk 16 passes through the slits of the fixed slit 18, and is converted into current at the photodiode 20.

The encoder 10 includes a main power-supply circuit 24, a backup battery 26, a driving circuit 28, a current obtaining portion 30, a current abnormality determining portion 32, an informing portion 34, and a main circuit 36. When the main power supply is on, the driving circuit 28 drives the main circuit 36 by using electric power from the main power-supply circuit 24. When the main power supply is off, the driving circuit 28 drives the main circuit 36 by using electric power from the backup battery 26. The current obtaining portion 30 obtains a backup current corresponding to a consumption current of the backup battery 26 when the main power supply is off. The current abnormality determining portion 32 determines whether an abnormality is occurring in the backup current when the main power supply is off. The current abnormality determining portion 32 is driven by using the power from the backup battery 26. The current abnormality determining portion 32 will be described in detail later. The informing portion 34 is, for example, a light, buzzer, or the like, and it is controlled by the current abnormality determining portion 32 and informs an operator of occurrence of an abnormality of the backup current.

The main circuit 36 includes the LED 14, the photodiode 20, an analog signal generating circuit 38, a comparator 40, and a rotation angle calculating portion 42. The analog signal generating circuit 38 generates an analog signal in accordance with the magnitude of the current outputted from the photodiode 20. The comparator 40 converts the analog signal outputted from the analog signal generating circuit 38 into a square wave signal. The rotation angle calculating portion 42 calculates a rotation angle of the object 22 of detection based on the square wave signal outputted from the comparator 40. A rotational speed of the object 22 of detection can be obtained from the square wave signal outputted from the comparator 40, and the comparator 40 thus constitutes a rotational speed obtaining portion 44.

[Backup Current]

The encoder 10 of this embodiment performs a backup for detecting the rotation angle of the object 22 of detection even when the main power supply is off. Accordingly, even when the object 22 of detection rotates while the main power supply is off, the rotation angle of the object 22 of detection can be accurately obtained when the main power supply turns on.

During the execution of backup, the driving circuit 28 intermittently drives the main circuit 36 so that consumption current of the backup battery 26 can be suppressed. Further, the driving circuit 28 drives the main circuit 36 more frequently as the rotational speed of the object 22 of detection is greater, so as to ensure accuracy of detection of the rotation angle of the object 22 of detection.

Figure 3:
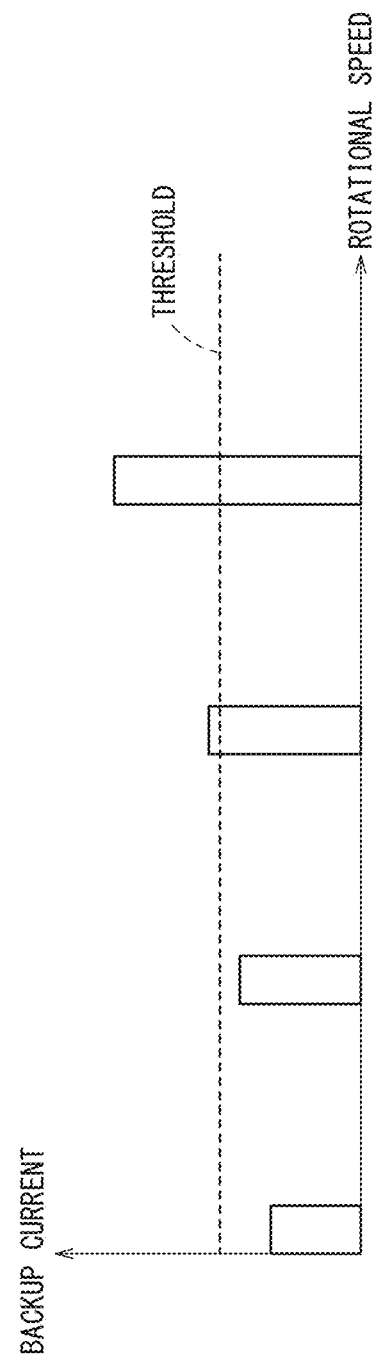
FIG. 3 is a graph showing a relation between a rotational speed of an object of detection and a backup current.

FIG. 3 is a graph showing a relation between the rotational speed of the object 22 of detection and the backup current. As mentioned above, the driving circuit 28 more frequently drives the main circuit 36 as the rotational speed of the object 22 of detection increases, and hence the backup current becomes larger as the rotational speed of the object 22 of detection increases.

[Backup Current Abnormality Determining Process]

Figure 4:
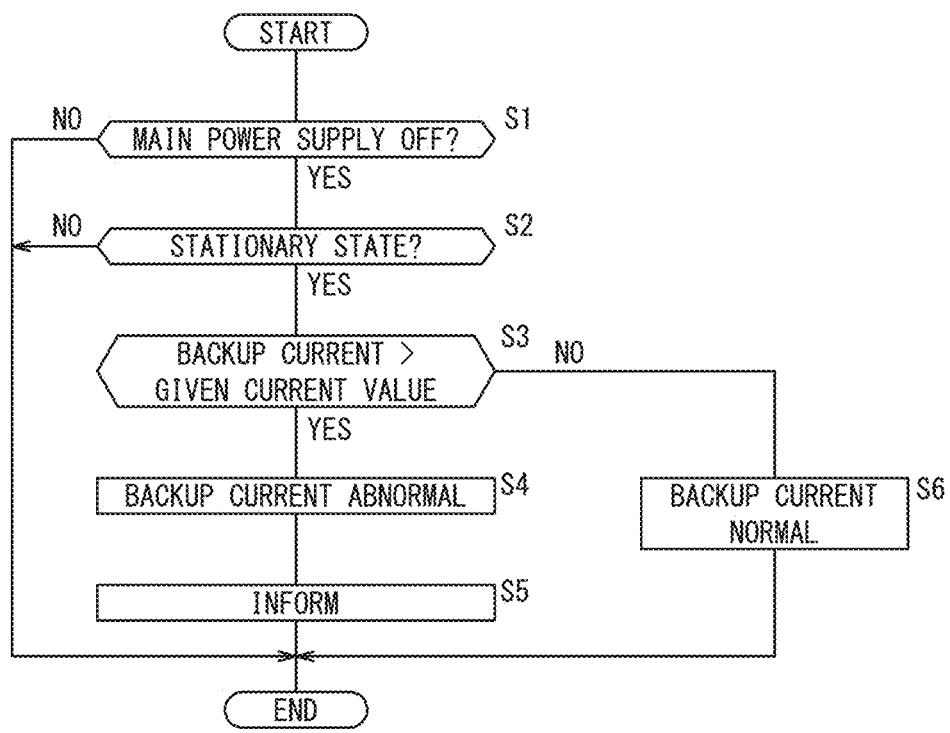
FIG. 4 is a flowchart showing a backup current abnormality determining process performed in a current abnormality determining portion.

FIG. 4 is a flowchart showing the flow of a backup current abnormality determining process performed at the current abnormality determining portion 32.

At step S1, the current abnormality determining portion 32 determines whether the main power supply is off. When the main power supply is off, the process proceeds to step S2. When the main power supply is on, the process is terminated.

At step S2, the current abnormality determining portion 32 determines whether the object 22 of detection is in a stationary state based on the square wave signal outputted from the comparator 40. The process proceeds to step S3 when the object 22 of detection is in the stationary state, and the process is terminated when the object 22 of detection is not in the stationary state. The stationary state of the object 22 of detection includes a case where the rotational speed of the object 22 of detection is zero and a case where the rotational speed of the object 22 of detection is small to such an extent that it does not appear as a variation in the square wave signal.

At step S3, the current abnormality determining portion 32 determines whether the backup current is larger than a given current value. When the backup current is larger than the given current value, the process proceeds to step S4. When the backup current is equal to or less than the given current value, the process proceeds to step S6.

At step S4, the current abnormality determining portion 32 determines that the backup current is abnormal and the process proceeds to step S5. At step S5, the current abnormality determining portion 32 controls the informing portion 34 so that the informing portion 34 informs the operator that the backup current is abnormal, and the process is terminated. At step S6, the current abnormality determining portion 32 determines that the backup current is normal and the process is terminated.

The backup current abnormality determining process at the current abnormality determining portion 32 may be conducted not throughout a time in which the main power supply is off but in part of the time. Further, the backup current abnormality determining process at the current abnormality determining portion 32 may be conducted intermittently while the main power supply is off.

Still further, the backup current abnormality determining process need not necessarily be performed after the current abnormality determining portion 32 has determined that the backup current is abnormal. Furthermore, when the current abnormality determining portion 32 has determined that the backup current is normal, the backup current abnormality determining process need not necessarily be performed until the main power supply turns from on to off next time.

At step S2, the current abnormality determining portion 32 may determine whether the rotational speed of the object 22 of detection corresponds to a given rotational speed, in place of determining whether the object 22 of detection is in the stationary state. In this case, the given current value according to which, at step S3, the current abnormality determining portion 32 determines whether the backup current is larger than the given current value is set at a current value corresponding to that given rotational speed.

[Functions and Effects]

The backup current varies depending on the rotational speed of the object 22 of detection. For example, even when a threshold for determining whether the backup current is abnormal is set as shown in FIG. 3, the backup current may increase over the threshold as the rotational speed of the object 22 of detection increases. Accordingly, it cannot be known whether the backup current increases due to an abnormality or the backup current increases due to an increase in the rotational speed of the object 22 of detection. It is then not possible to determine whether or not the backup current is abnormal.

Accordingly, in the encoder 10 of the present embodiment, the current abnormality determining portion 32 determines that the backup current is abnormal when the object 22 of detection is in the stationary state and the backup current is larger than the given current value. The current abnormality determining portion 32 can correctly determine whether the backup current is abnormal by setting the given current value based on a normal backup current in the stationary state of the object 22 of detection.

Further, during the execution of backup, the time in which the object 22 of detection is in the stationary state is longer than the time in which it is rotating. Thus, since whether the backup current is abnormal or not is determined while the object 22 of detection is in the stationary state, it is possible to set a larger number of occasions for making the determination as to whether the backup current is abnormal or not.

Further, according to the encoder 10 of this embodiment, the current abnormality determining portion 32 checks for abnormalities of the backup current in part of a time in which the backup is being executed. Further, according to the encoder 10 of the embodiment, the current abnormality determining portion 32 intermittently checks for abnormalities of the backup current during the execution of backup. During the execution of backup, the current abnormality determining portion 32 is also driven by power from the backup battery 26. It is therefore possible to achieve power saving of the current abnormality determining portion 32 and suppress decrease of the capacity of the backup battery 26.

Technical Ideas Obtained from Embodiment

Technical ideas that can be grasped from the above-described embodiment will be described below.

An encoder (10) for detecting a rotation angle of an object (22) of detection includes: a main circuit (36) including a rotational speed obtaining portion (44) configured to obtain a rotational speed of the object (22) of detection; a backup battery (26) for supplying electric power to the main circuit (36) while the main circuit (36) is disconnected from a main power-supply circuit (24); a current obtaining portion (30) configured to obtain a consumption current of the backup battery (26) as a backup current while the electric power is being supplied from the backup battery (26) to the main circuit (36); and a current abnormality determining portion (32) configured to determine that the backup current is abnormal if the backup current is larger than a given current value when the rotational speed of the object (22) of detection obtained by the rotational speed obtaining portion (44) is a given rotational speed. The current abnormality determining portion (32) can thus accurately determine whether the backup current is abnormal.

In the above-described encoder (10), the current obtaining portion (30) may be configured to obtain the backup current and the current abnormality determining portion (32) may be configured to determine whether the backup current is abnormal in part of a time in which the electric power is being supplied from the backup battery (26) to the main circuit (36). It is then possible to achieve power saving of the current obtaining portion (30) and the current abnormality determining portion (32) and suppress decrease of the capacity of the backup battery (26).

In the above-described encoder (10), the current obtaining portion (30) may be configured to intermittently obtain the backup current and the current abnormality determining portion (32) may be configured to intermittently determine whether the backup current is abnormal while the electric power is being supplied from the backup battery (26) to the main circuit (36). It is then possible to achieve power saving of the current obtaining portion (30) and the current abnormality determining portion (32) and suppress decrease of the capacity of the backup battery (26).

In the above-described encoder (10), the current obtaining portion (30) may be configured to obtain the backup current and the current abnormality determining portion (32) may be configured to determine whether the backup current is abnormal when the rotational speed of the object (22) of detection obtained by the rotational speed obtaining portion (44) represents a stationary state. Then, the current abnormality determining portion (32) can set a large number of occasions for determining whether the backup current is abnormal.

For an encoder (10) having a backup battery (26) for supplying electric power to a main circuit (36) while the main circuit (36) is disconnected from a main power-supply circuit (24), a current abnormality determining method for determining whether a backup current corresponding to a consumption current of the backup battery (26) is abnormal includes: a current obtaining step of obtaining the consumption current of the backup battery (26) as the backup current while the electric power is being supplied from the backup battery (26) to the main circuit (36); a rotational speed obtaining step of obtaining a rotational speed of an object (22) of detection; and a current abnormality determining step of determining that the backup current is abnormal if the backup current is larger than a given current value when the rotational speed of the object (22) of detection obtained at the rotational speed obtaining step is a given rotational speed. The current abnormality determining portion (32) can thus accurately determine whether the backup current is abnormal.

In the above-described current abnormality determining method, the current obtaining step may obtain the backup current and the current abnormality determining step may determine whether the backup current is abnormal in part of a time in which the electric power is being supplied from the backup battery (26) to the main circuit (36). It is then possible to achieve power saving of the current obtaining portion (30) and the current abnormality determining portion (32) and suppress decrease of the capacity of the backup battery (26).

In the above-described current abnormality determining method, the current obtaining step may intermittently obtain the backup current and the current abnormality determining step may intermittently determine whether the backup current is abnormal while the electric power is being supplied from the backup battery (26) to the main circuit (36). It is then possible to achieve power saving of the current obtaining portion (30) and the current abnormality determining portion (32) and suppress decrease of the capacity of the backup battery (26).

In the above-described current abnormality determining method, the current obtaining step may obtain the backup current and the current abnormality determining step may determine whether the backup current is abnormal when the rotational speed of the object (22) of detection obtained at the rotational speed obtaining step represents a stationary state. Then, the current abnormality determining portion (32) can set a large number of occasions for determining whether the backup current is abnormal.

Although certain preferred embodiments of the present invention have been shown and described in detail, it should be understood that various changes and modifications may be made therein without departing from the scope of the appended claims.

What is claimed is:

1. An encoder for detecting a rotation angle of an object of detection, comprising:
   a main circuit including a rotational speed obtaining portion configured to obtain a rotational speed of the object of detection;
   a backup battery for supplying electric power to the main circuit while the main circuit is disconnected from a main power-supply circuit;
   a current obtaining portion configured to obtain a consumption current of the backup battery as a backup current while the electric power is being supplied from the backup battery to the main circuit; and a current abnormality determining portion configured to determine that the backup current is abnormal if the backup current is larger than a given current value when the rotational speed of the object of detection obtained by the rotational speed obtaining portion is a given rotational speed.

2. The encoder according to claim 1, wherein the current obtaining portion is configured to obtain the backup current and the current abnormality determining portion is configured to determine whether the backup current is abnormal in part of a time in which the electric power is being supplied from the backup battery to the main circuit.

3. The encoder according to claim 1, wherein the current obtaining portion is configured to intermittently obtain the backup current and the current abnormality determining portion is configured to intermittently determine whether the backup current is abnormal while the electric power is being supplied from the backup battery to the main circuit.

4. The encoder according to claim 1, wherein the current obtaining portion is configured to obtain the backup current and the current abnormality determining portion is configured to determine whether the backup current is abnormal when the rotational speed of the object of detection obtained by the rotational speed obtaining portion represents a stationary state.

5. A backup current abnormality determining method for an encoder having a backup battery for supplying electric power to a main circuit while the main circuit is disconnected from a main power-supply circuit, the backup current abnormality determining method determining whether a backup current corresponding to a consumption current of the backup battery is abnormal, the backup current abnormality determining method comprising:

a current obtaining step of obtaining the consumption current of the backup battery as the backup current while the electric power is being supplied from the backup battery to the main circuit;

a rotational speed obtaining step of obtaining a rotational speed of an object of detection; and a current abnormality determining step of determining that the backup current is abnormal if the backup current is larger than a given current value when the rotational speed of the object of detection obtained at the rotational speed obtaining step is a given rotational speed.

6. The backup current abnormality determining method according to claim 5, wherein the current obtaining step obtains the backup current and the current abnormality determining step determines whether the backup current is abnormal in part of a time in which the electric power is being supplied from the backup battery to the main circuit.

7. The backup current abnormality determining method according to claim 5, wherein the current obtaining step intermittently obtains the backup current and the current abnormality determining step intermittently determines whether the backup current is abnormal while the electric power is being supplied from the backup battery to the main circuit.

8. The backup current abnormality determining method according to claim 5, wherein the current obtaining step obtains the backup current and the current abnormality determining step determines whether the backup current is abnormal when the rotational speed of the object of detection obtained at the rotational speed obtaining step represents a stationary state.

* * * * *